United States Patent
Dooney, Jr. et al.

(10) Patent No.: US 12,465,352 B2
(45) Date of Patent: Nov. 11, 2025

(54) SUTURE TENSIONER AND METHODS OF TENSIONING

(71) Applicant: Arthrex, Inc., Naples, FL (US)

(72) Inventors: Thomas Dooney, Jr., Naples, FL (US); Jason A. Valentin, Fort Myers, FL (US)

(73) Assignee: Arthrex, Inc., Naples, FL (US)

( * ) Notice: Subject to any disclaimer, the term of this patent is extended or adjusted under 35 U.S.C. 154(b) by 0 days.

(21) Appl. No.: 17/725,061

(22) Filed: Apr. 20, 2022

(65) Prior Publication Data
US 2023/0338019 A1    Oct. 26, 2023

(51) Int. Cl.
*A61B 17/04* (2006.01)
*A61B 17/00* (2006.01)

(52) U.S. Cl.
CPC .... *A61B 17/0483* (2013.01); *A61B 2017/00407* (2013.01); *A61B 2017/00486* (2013.01); *A61B 2017/0496* (2013.01)

(58) Field of Classification Search
CPC ...... A61B 17/0483; A61B 2017/00407; A61B 2017/00486; A61B 2017/0496; A61B 17/0467
See application file for complete search history.

(56) References Cited

U.S. PATENT DOCUMENTS

| | | | |
|---|---|---|---|
| 8,435,262 B2 | 5/2013 | Ortiz et al. | |
| 9,820,730 B2 | 11/2017 | Chu | |
| 2003/0208210 A1* | 11/2003 | Dreyfuss | A61B 17/0483 606/144 |
| 2004/0162569 A1* | 8/2004 | Sikora | A61B 17/0467 606/148 |
| 2005/0033363 A1* | 2/2005 | Bojarski | A61B 17/06166 606/228 |
| 2008/0033460 A1* | 2/2008 | Ziniti | A61B 17/0401 606/148 |
| 2008/0275477 A1* | 11/2008 | Sterrett | A61B 17/8869 606/148 |
| 2011/0190792 A1* | 8/2011 | Chu | A61B 17/0469 606/144 |
| 2013/0096611 A1* | 4/2013 | Sullivan | A61B 17/0485 606/232 |
| 2015/0157440 A1* | 6/2015 | Flynn | A61F 2/0045 606/208 |

(Continued)

FOREIGN PATENT DOCUMENTS

| | | |
|---|---|---|
| EP | 2730232 A1 | 5/2014 |
| WO | 2013142487 A1 | 9/2013 |
| WO | 2019055433 A1 | 3/2019 |

*Primary Examiner* — Julian W Woo
*Assistant Examiner* — Mohammed S Adam
(74) *Attorney, Agent, or Firm* — Potomac Law Group, PLLC

(57) ABSTRACT

A surgical tensioner and methods for surgical repairs. A tensioning adapter can be removably attached to, and detached from, a handle and/or elongated shaft of a surgical instrument to allow a flexible strand (suture or wire) attached to tissue (for example, soft tissue, graft or bone segments) to be secured to it and tensioned. A tensioning adapter can include a securing mechanism that can capture a flexible strand and lock it into place. A tensioning adapter can include an adjustment device to adjust tension on the flexible strand.

17 Claims, 7 Drawing Sheets

(56) References Cited

U.S. PATENT DOCUMENTS

| | | | |
|---|---|---|---|
| 2015/0250471 A1* | 9/2015 | Nason | A61B 17/0482 |
| | | | 606/232 |
| 2016/0317144 A1* | 11/2016 | Popovici | A61B 17/0469 |
| 2018/0085109 A1* | 3/2018 | Petry | A61B 17/04 |
| 2021/0000464 A1 | 1/2021 | Zhang et al. | |

* cited by examiner

SUTURE TENSIONER AND METHODS OF TENSIONING

BACKGROUND

The disclosure relates to surgical instruments and methods for tensioning of flexible materials and, more specifically, to novel tensioning devices.

SUMMARY

A surgical tensioner and methods for surgical repairs are disclosed. A tensioner can tension a flexible strand (suture, wire or fabric) attached to tissue (for example, soft tissue, graft or bone segments). A tensioner can tension a flexible strand attached to tissue and can be also employed in at least another surgical procedure. A tensioner can include a tensioning adapter designed to be fitted onto any surgical instrument provided with a longitudinal barrel to allow the surgical instrument to aid in suture tensioning. The longitudinal barrel of the instrument offsets the tensioning adapter from the surgical site while the distal end of the longitudinal barrel maintains contact to the repair site. A tensioning adapter can include a securing mechanism and an adjustment device that can capture a flexible strand and maintain suture tension on the flexible strand.

Methods of tensioning are also disclosed. In an embodiment, flexible material can be tensioned with a tensioning adapter that can be attached or fitted to common surgical instrumentation.

DETAILED DESCRIPTION

Figure 1:
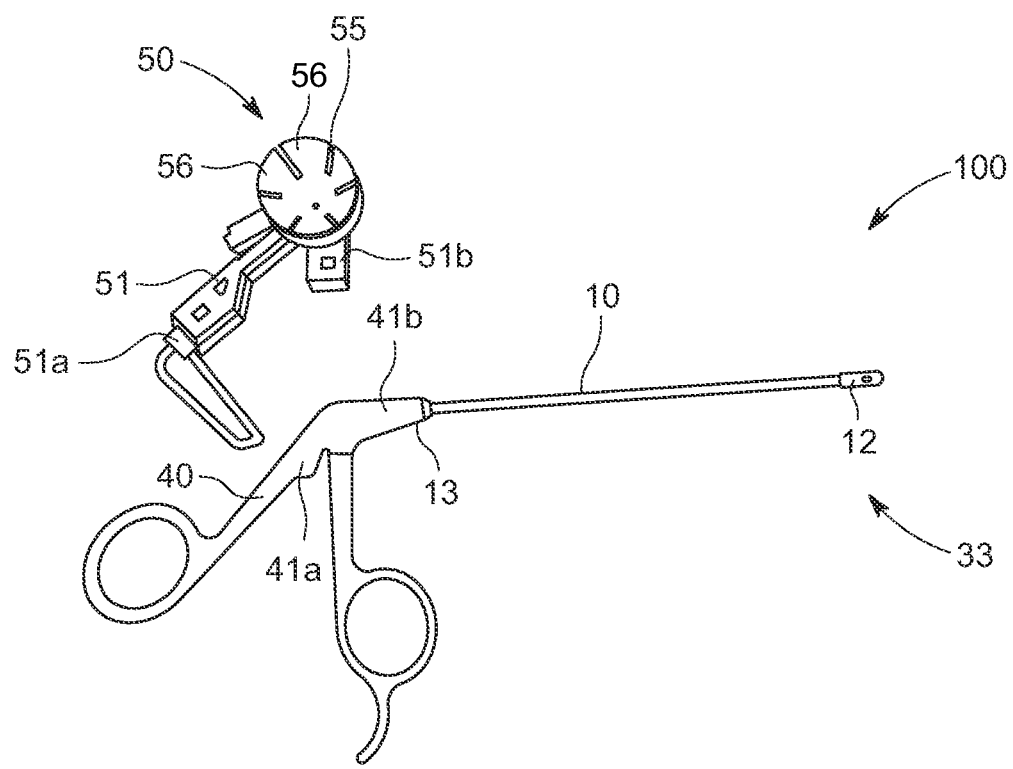
FIG. 1 is a perspective view of a suture tensioner (with a tensioning adapter illustrated unattached to a surgical instrument) according to an embodiment.
Figure 2:
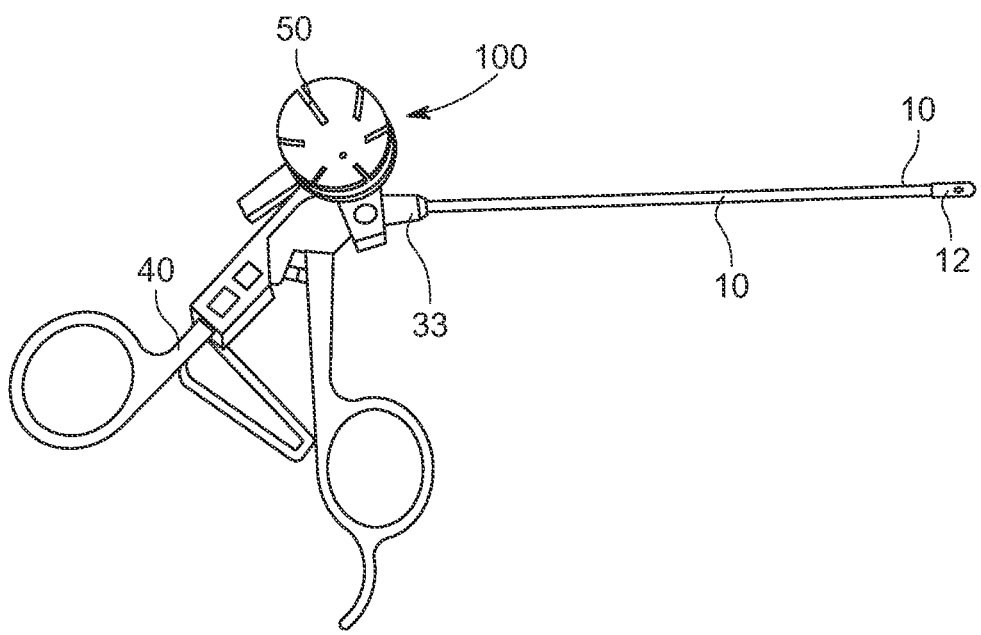
FIG. 2 is a perspective view of the suture tensioner of FIG. 1 (with a tensioning adapter attached to a surgical instrument).
Figure 3:
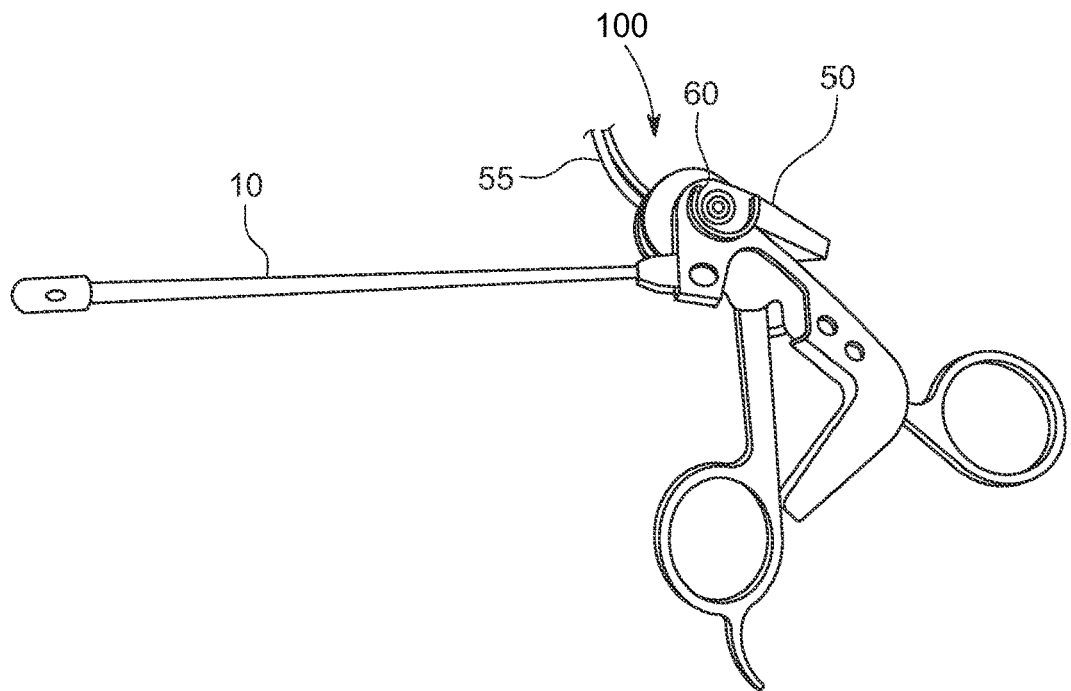
FIG. 3 is another view of the suture tensioner of FIG. 2.

A tensioner employed for applying tension to a length of flexible material, for example suture such as high strength suture, tape, wire, cable, or fabric is disclosed. A suture tensioner includes a tensioning adapter designed to be fitted onto "common" surgical instrumentation to allow the surgical instrument to aid in suture tensioning while using the auxiliary purpose of the surgical instrument. The tensioning adapter can be designed to be fitted onto a surgical instrument with a longitudinal barrel to offset the tensioner from the surgical site while maintaining contact to the repair site with the distal end of the barrel. The tensioner can function in multiple configurations, tensioning the sutures away from the repair site. The tensioner can ratchet to maintain tension and can also indicate the tension of the suture. The tensioning adapter can be attached to a handle of a surgical instrument provided with a longitudinal shaft or barrel.

The device of the present disclosure is an attachment/adapter that can be mounted onto surgical instrumentation to tension suture while using the auxiliary purpose of the surgical instrument. The surgical instrument can be any instrument with a longitudinal elongated shaft or barrel, for example, a suture retriever, suture cutter, knot pusher/suture retriever instrument, driver of one or more fixation devices, or any similar instrument with a longitudinal barrel to offset the tensioner from the surgical site while maintaining contact to the repair site with the distal end of the barrel. The attachment/adapter can be attached to and detached from the surgical instrument.

In use, suture from a repair site can be loaded into or captured by a distal end of the surgical instrument. The suture is loaded onto a tensioning adapter attached to the surgical instrument. The distal end of the barrel is positioned against the repair site. The tensioning adapter tensions the suture to the desired tension. In an embodiment, suture from the repair site can be loaded into or captured by the distal end of the instrument. In an embodiment, suture from the repair site is neither loaded into nor captured by the distal end of the instrument.

The suture can be further secured to a capturing mechanism or securing device (for example, passed and cleated) and then tensioned by actuating an adjustment device (for example, by twisting or turning a knob or wheel) of the tensioning adapter. Turning the adjustment device draws against the suture, increasing therefore the tension on suture. The tensioner may be employed in conjunction with a tensiometer. The tensiometer indicates how much force is being applied to the suture and the final construct.

In an embodiment, a tensioner comprises: a shaft of a surgical instrument, the shaft having a distal end and a proximal end; and a tensioning adapter designed to removably attach to the surgical instrument, to allow a flexible strand to be loaded onto the tensioning adapter to tension the flexible strand to the desired tension. The surgical instrument can include a handle at the proximal end. The tensioning adapter can be removably attached to, and detached from, a handle of the instrument. The tensioning adapter can include a securing mechanism to allow secure placement and capturing of the flexible strand; and an adjustment device to exert a desired tension on the flexible strand. The flexible strand can be suture, tape, wire, cable, fabric or any known material used to secure tissue, for example, soft tissue such as graft or tendon (for example, a biceps tendon or a rotator cuff), bone, cartilage, ligament, etc. which require suture attachment and appropriate tension. The tensioner can further include a tensiometer.

Methods of tensioning flexible strands such as sutures, wires, tapes, cables or fabrics are also disclosed. In an embodiment, a method of tensioning a flexible strand comprises: attaching a tensioning adapter to a surgical instrument in the vicinity of at least one flexible strand of a surgical site; and tensioning the at least one flexible strand with the tensioning adapter. The surgical instrument can be any instrument employed in a surgical procedure conducted at the surgical site. The surgical instrument can be any instrument with a longitudinal shaft employed in manipulating and/or securing of the at least one flexible strand at the surgical site, such as, for example, a driver of a fixation device, a suture cutter instrument or a suture retriever instrument, among many others. The tensioning adapter removably attaches to and detaches from the surgical instrument. The tensioning adapter can be attached to the surgical instrument only when tensioning of the at least one flexible strand is necessary. The tensioning adapter can be attached to the surgical instrument during the entire period of time when the surgical instrument is used at the surgical site.

Referring now to the drawings, where like elements are designated by like reference numerals, FIGS. 1-12 illustrate various structural components of tensioner 100, 200 (assembly 100, 200; hybrid instrument 100, 200; instrument 100, 200; device 100, 200; suture tensioner 100, 200; tensioning device 100, 200; suture tensioning device 100, 200) of the present disclosure, as well as methods of tissue repair and tensioning with tensioner 100, 200.

As detailed below, tensioner 100, 200 is an assembly or hybrid surgical instrument which includes a tensioning adapter 50, 150 mounted onto a surgical instrument 33, 133. Tensioning adapter 50, 150 (adapter 50, 150; attachment 50, 150; tensioning attachment 50, 150) has a design that allows it to be fitted onto existing surgical instruments (surgical instrumentation) to allow the surgical instrument to aid in suture tensioning in addition to the procedure for which the instrument is used and/or intended and/or employed. Tensioning adapter 50, 150 can be fitted and/or removably attached to and detached from any surgical instrument provided with an elongated shaft or barrel such as surgical instruments 33, 133.

FIG. 1 illustrates exemplary tensioning adapter 50 prior to attachment to exemplary surgical instrument 33. FIGS. 2-6 illustrate tensioning adapter 50 attached to exemplary surgical instrument 33 to form tensioner 100. FIGS. 7-10 illustrate additional views of the tensioning adapter 50.

Surgical instrument 33 is provided with an elongated shaft or barrel 10 (cannulated shaft 10; tube section 10). Instrument 33 can be any device which includes a cannulated elongated shaft 10 having a distal end 12 and a proximal end 13. Cannulated elongated shaft 10 can be provided at its proximal end 13 with a handle 40, as shown in FIGS. 1-6. The elongated shaft 10 allows tensioner 100 to be offset from the surgical site (repair site) while contact to the repair site is maintained with the distal end 12 of the elongated shaft 10. Instrument 33 can be any surgical instrument with a long shaft employed for a surgical repair requiring at least one flexible strand that can be tensioned. Instrument 33 can be (but it does not need be) employed in securing a flexible strand to tissue during a tissue fixation procedure (for example, suturing, suture cutting, or any procedure requiring suture and/or suture tensioning).

Exemplary tensioning adapter 50 includes body 51, capturing mechanism 55 (securing mechanism 55), and adjustment device 60 (adjustment mechanism 55). Body 51 can have any shape and configuration designed to allow the adapter 50 to be securely attached to, and easily disengaged from, handle 40 of surgical instrument 33. The shape and configuration of the body 51 will depend upon the shape and configuration of the handle 40. For example, FIGS. 1-10 illustrate tensioning adapter 50 with body 51 having a first section 51a and a second section 51b designed to securely engage and attach to a first section 41a and a second section 41b, respectively, of handle 40, and to also be easily removed from the surgical instrument 33 once tensioning has been completed. First section 51a and second section 51b are mounting features or structures that allow attachment to and detachment from handle 40. In other embodiments, body 51 can be configured to allow engagement to/disengagement from various types of handles of common surgical instruments. As such, body 51 can be designed to dimensions that correspond to the dimensions of the handle/shaft of the specific surgical instrument to be attached to.

Capturing mechanism 55 can be any securing mechanism that allows at least one limb of a flexible strand from a repair site to be secured to the tensioning adapter 50. Capturing mechanism 55 can include a plurality of suture cleats or forked pins or slits or slots to allow a flexible strand to be passed therethrough at least once. An exemplary capturing mechanism 55 is in the form of a daisy-shaped structure with slits or slots or passages formed by (and in between) flower "petals" 56 allowing secure capturing, attachment and/or detachment of one or more flexible strands therebetween. The design allows easy wrapping and holding of the flexible strand/material before and during tensioning.

Adjustment device 60 (shown more clearly in FIGS. 3, 7, 9) can be provided integral with the capturing mechanism 55. Adjustment device 60 can be provided separate from the capturing mechanism 55. Adjustment device 60 can be an adjustment knob or wheel or similar structure that allows one or more suture strands passed through capturing mechanism 55 to be secured to it and tensioned. Adjustment wheel 60 allows a user to easily maneuver and turn the wheel during a suture tensioning procedure by employing, for example, a thumb crank or by turning a wheel. Adjustment device 60 can be also in the form of a knob. The knob or wheel can be configured to be removed from the adapter 50, to allow passage of at least one suture strand, and to be subsequently reinserted over the fed suture strand. A crank mechanism can allow suture limbs to wrap around and be tensioned.

Figure 7:
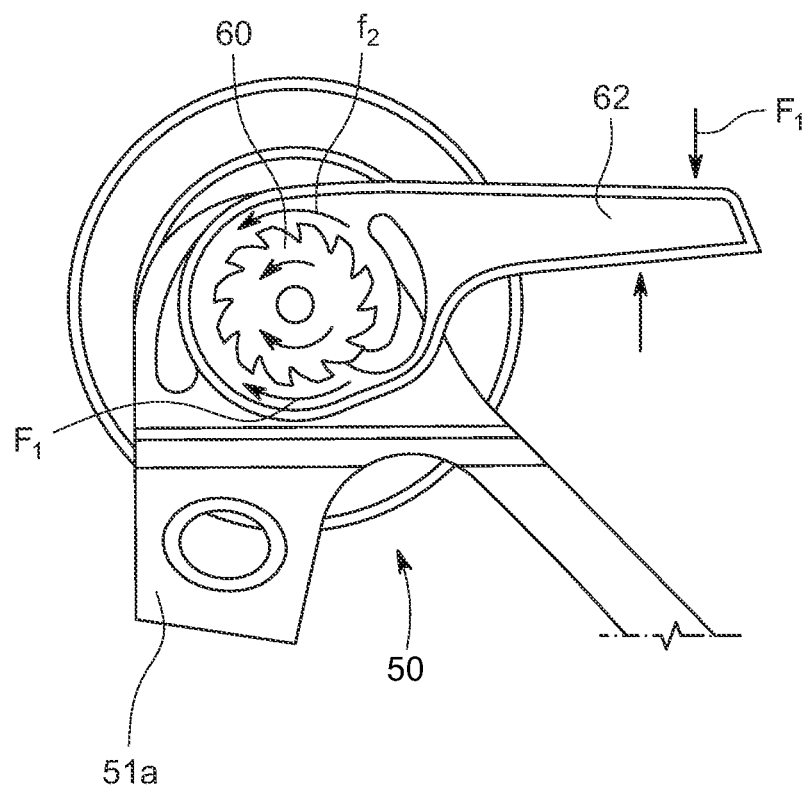
FIGS. 7-10 illustrate various views of a tensioning adapter.
Figure 8:
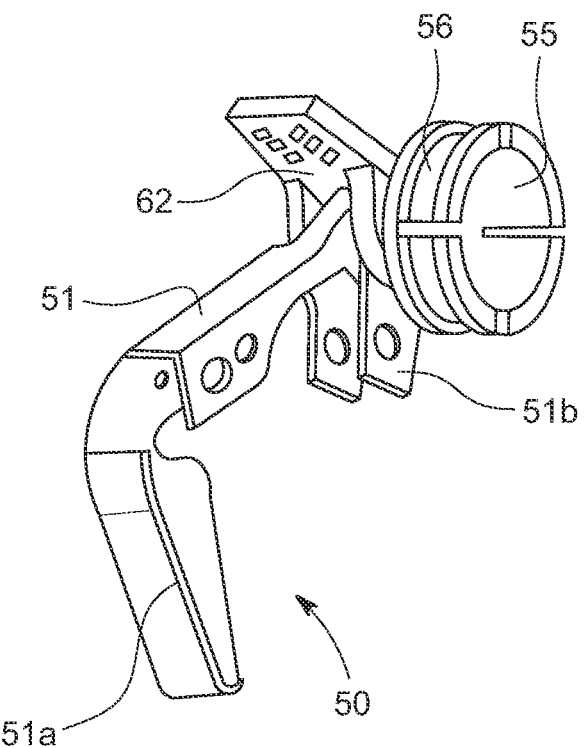
Figure 9:
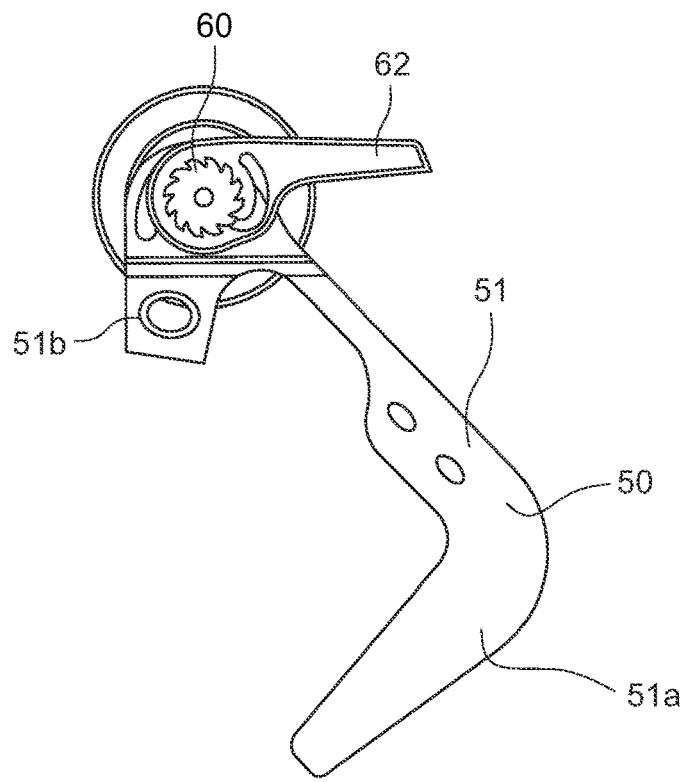
Figure 10:
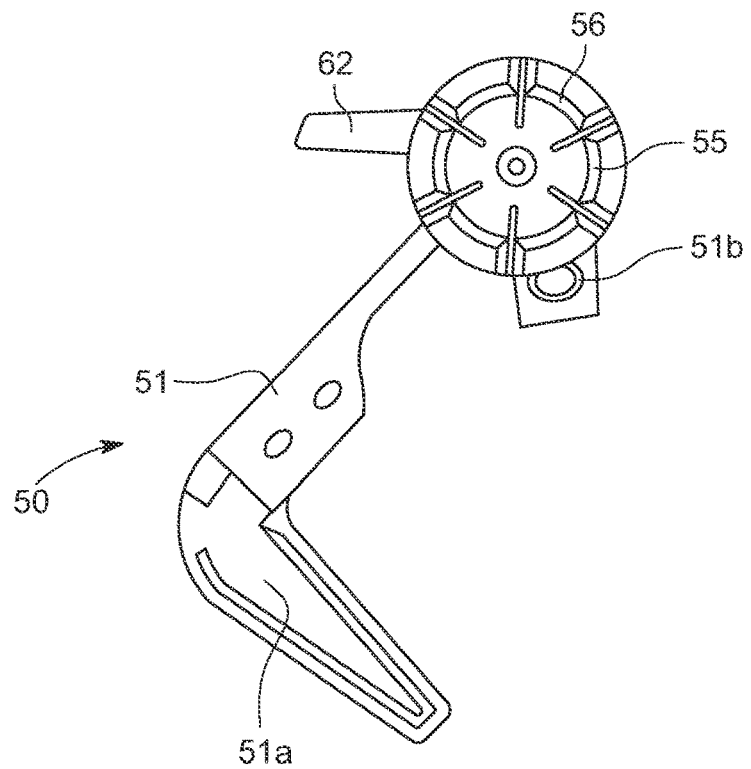

FIGS. 7-10 illustrate a particular design of tensioning adapter 50. In this exemplary embodiment, the tensioning adapter can be operated and tensioned with the thumb crank or by turning the suture wheel. This has a locking/ratcheting feature to tension and maintain the tension on the suture. As shown in FIG. 7, actuating thumb crank 62 in direction F1, turns the wheel in direction f1; similarly, actuating thumb crank 62 in an opposite direction, for example, in direction F2, allows the wheel to turn in direction f2.

Tensioner 100 can function in multiple configurations, tensioning the sutures away from the repair site. The tensioner can ratchet to maintain tension and can also indicate the tension of the suture. The tensioning adapter 50 can be attached to any handle of a surgical instrument provided with a longitudinal shaft or elongated barrel (such as shaft 10 of exemplary device 33). Elongated shaft 10 can include a cannulation provided with at least one longitudinal slit or slot having specific configuration and dimension that can allow a flexible strand (for example, suture strand or suture tape) to freely pass through the cannulated shaft at the distal end/tip. Tensioner 100 can be employed in conjunction with a tensiometer, or it can be provided with a built-in tensiometer.

Figure 4:
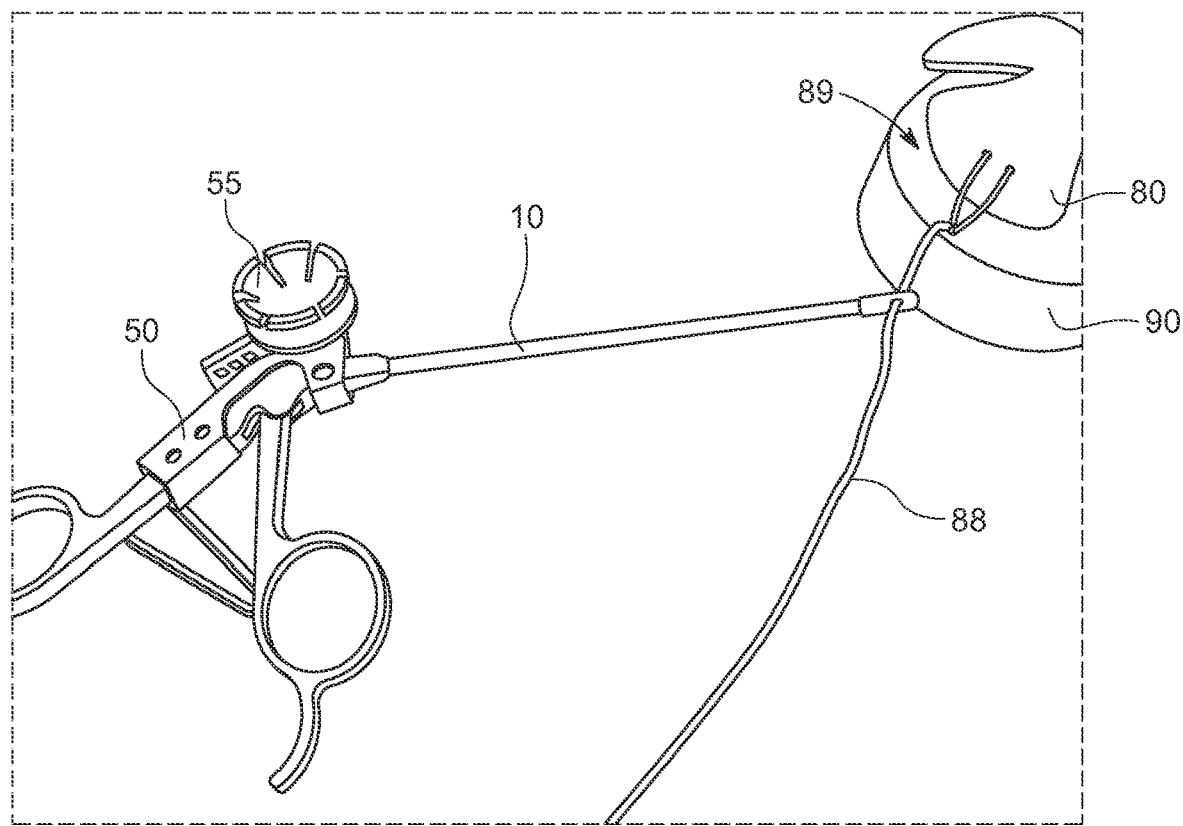
FIGS. 4-6 illustrate an exemplary method of suture tensioning with a suture tensioner.

Tensioner 100 and/or tensioning adapter 50 detailed above can be used to secure any type of tissue, for example cartilage, ligament, bone, graft or tendon, such as a biceps tendon or a rotator cuff, which require suture attachment and appropriate tension. Tensioner 100 and/or tensioning adapter 50 detailed above can be also employed to encircle a bone or bone fragment, or in various cerclage procedures. Tensioner 100 and/or tensioning adapter 50 detailed above can be also employed to attach a first tissue to a second tissue, for example, soft tissue to bone. In an exemplary embodiment, surgical instrument 33 can be a suture cutter. An exemplary sequence of steps for tensioning and cutting flexible strand 88 (flexible member 88; flexible coupler 88; suture 88; suture tape 88) with assembly 100 (hybrid instrument 100) is set forth below with reference to FIGS. 4-6:

FIG. 4: suture 88 from a surgical site is loaded into or captured by distal end 12 of instrument 33. Suture 88 is employed in a method of securing a first tissue 80 to a second tissue 90, for example, fixation of soft tissue 80 to bone 90. Flexible strand 88 can be passed at least once, preferably multiple times, around or through first tissue 80 to form a plurality of passes 89. Flexible strand 88 can be suture in the form of high strength suture such as Arthrex FiberWire® suture or tape, for example, suture tape such as Arthrex FiberTape® suture tape. Tensioning adapter 50 can be attached to handle 40 of instrument 33 before or after the repair has been conducted, e.g., before or after suture passes 89 have been completed.

Figure 5:
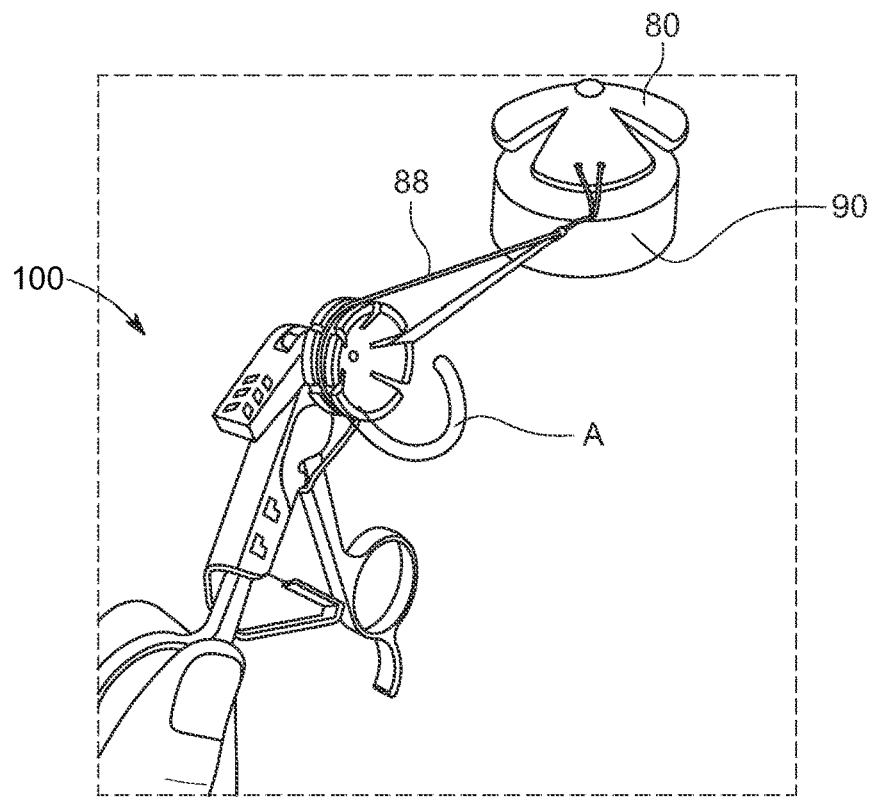

FIG. 5: suture 88 is loaded onto tensioning adapter 50 of tensioner 100. The distal end 12 of the barrel 10 of surgical cutter 33 is against the surgical site and suture passes 89. The tensioner tensions suture 88 to the desired tension by turning adjustment device 60 in the direction of arrow A. The suture from the repair site may or may not be loaded into (or captured by) the distal end of the instrument. Suture 88 is secured to capturing mechanism 55 by being passed through the suture cleats (slits or slots or passages) formed by and in between "petals" 56 multiple times.

Figure 6:
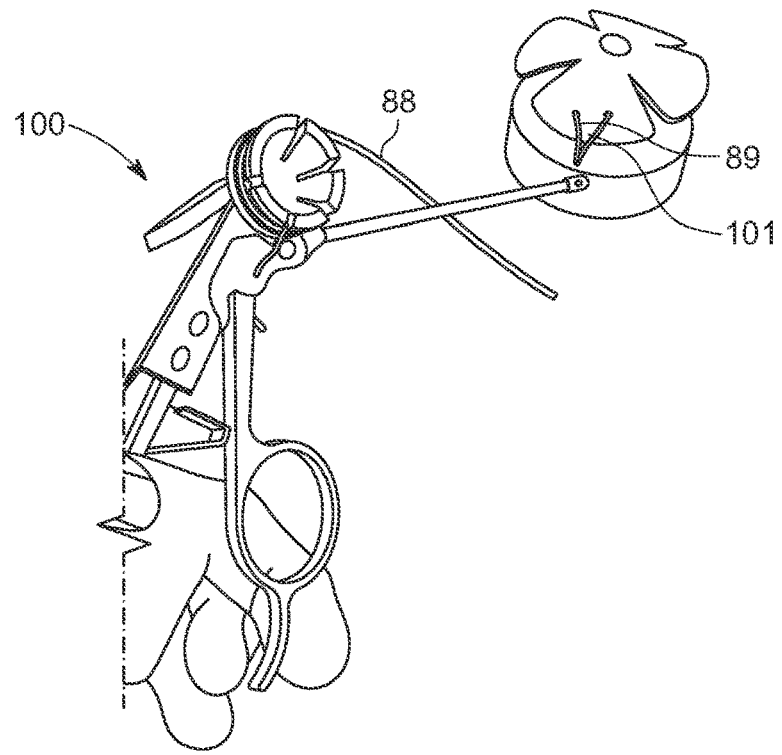

FIG. 6: once the desired tension has been achieved, suture 88 is cut with suture cutter 33 to obtain final repair 101. The handles of the instrument 33 (suture cutter 33) are squeezed together to cut the tensioned suture 88. The adapter 50 can be removed from the surgical instrument 33 and tensioner 100 and can be reused on another instrument or can be disposed of. By removably attaching the tensioning adapter 50 to the suture cutter instrument 33, tensioner 100 is used to provide both suture tensioning and also suture cutting (retaining the auxiliary function of the suture cutter instrument 33).

Figure 11:
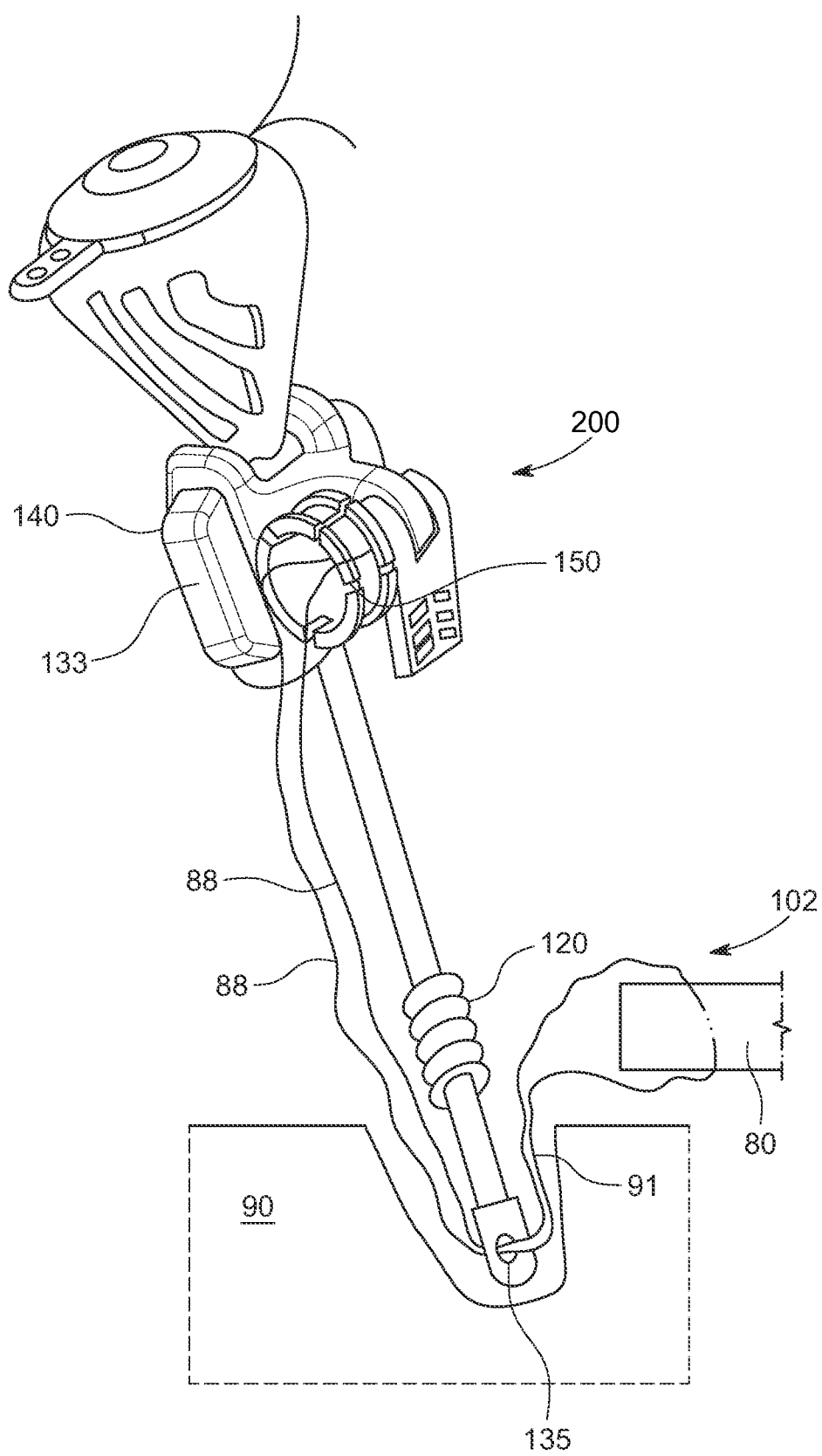
FIG. 11 illustrates a suture tensioner according to another embodiment and employed in a tissue repair.
Figure 12:
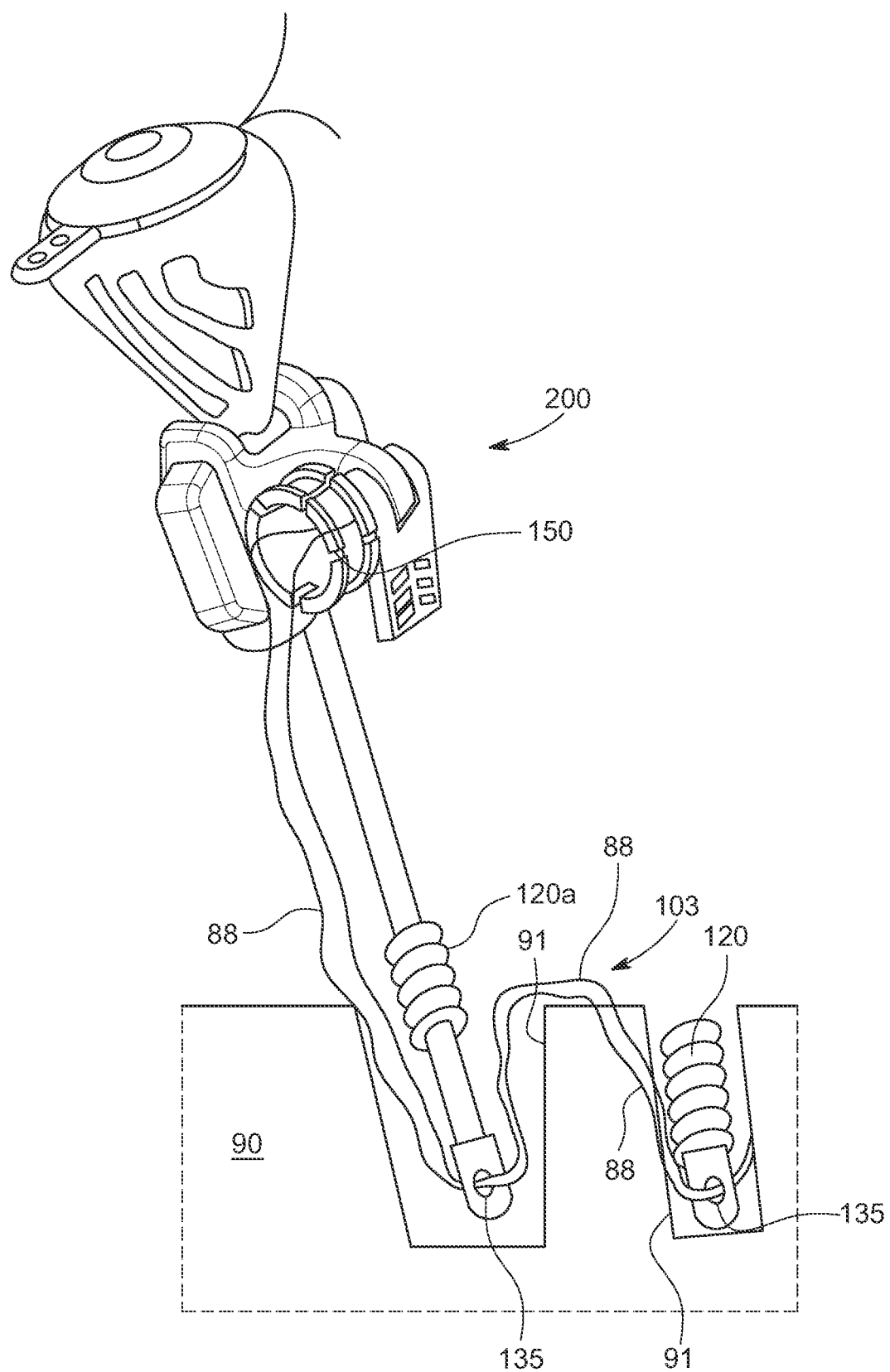
FIG. 12 illustrates the suture tensioner of FIG. 11 employed in another tissue repair.

FIGS. 11 and 12 illustrate another exemplary embodiment of a tensioner of the present disclosure. Tensioner 200 includes a suture tensioner 150 attached to a suture anchor inserter 133. Sutures 88 from soft tissue 80 or from an another anchor can be loaded into suture anchor eyelet 135 and then fed into tensioner 150. In an exemplary embodiment, suture anchor inserter 133 is part of a SwiveLock® suture anchor. The fully threaded, knotless SwiveLock® C anchor can be used with FiberWire® or FiberTape® sutures 88 during rotator cuff repair with the SpeedFix™, SutureBridge™, or SpeedBridge™ technique, or any similar technique. Details of an Arthrex SwiveLock® anchor and method of soft tissue repairs are disclosed, for example, in U.S. Pat. Nos. 8,012,174 and 9,005,246, the disclosures of both of which are fully incorporated by reference in their entirety herein. Tensioning adapter 150 is removably attached to thumb pad 140 of inserter 133 to aid in suture tensioning, similarly to tensioner 100 detailed above.

FIG. 11 illustrates attachment of soft tissue 80 to flexible strands 88 passed through eyelet 135 of a SwiveLock® suture anchor 120 to be fixated within hole 91 formed within bone 90, as part of repair 102.

FIG. 12 illustrates repair 103 with tensioner 200 employed to secure two fixation devices 120, 120a as part of repair 103. Interconnected knotless anchors 120, 120a can be employed to connect suture strands 88 from one anchor to another anchor and then fed to tensioning adapter 150. In repairs where two or more fixation devices are employed, at least one of the fixation devices can be an anchor (knotted anchor, knotless anchor or all-suture anchor), implant, button, screw or any fixation device that confers secure attachment and fixation of a first tissue to a second tissue, for example, soft tissue to bone. The fixation device can be a knotless suture anchor such as the two-piece Arthrex PushLock® anchor, disclosed in U.S. Pat. No. 7,329,272, or another Arthrex SwiveLock® anchor, disclosed in U.S. Pat. Nos. 8,012,174 and 9,005,246, the disclosures of all of which are fully incorporated by reference in their entirety herein.

Tensioning of one or more flexible strands 88 can be conducted prior to, simultaneously with, or subsequent to the fixation of fixation device 120, 120a with instrument 133 within bone 90.

Tensioning adapter 50, 150 and/or assembly 100, 200 described above can be employed in any surgical applications that require suture tensioning, for example, in shoulder applications where the device may be employed as both a suture cutter and a suture tensioner, or as both a suture anchor driver and a suture tensioner, among many other dual or multiple function applications.

Suture 88 can be fixed or fixated within second tissue 90 (e.g., within a tunnel or socket within bone 90) with fixation devices known in the art (for example, screws, anchors or buttons) and by known methods in the art. The fixation device can be an anchor formed of metal, biocompatible plastic such as PEEK or a bioabsorbable PLLA material or a biocomposite material. Alternatively, the fixation device can be a soft anchor, for example, an all-suture knotless anchor. If a knotless fixation device is employed, the surgical construct provides knotless tissue to tissue fixation, without any knot formation, and with increased fixation and soft tissue compression to achieve final fixation. Details of an exemplary soft suture anchor with a soft anchor sleeve (sheath or tubular member) and flexible shuttling strands are set forth, for example, in U.S. application Ser. No. 15/998, 516 entitled "Methods of Tissue Repairs" filed on Aug. 16, 2018 (issued as U.S. Pat. No. 10,849,734 on Dec. 1, 2020), the disclosure of which is incorporated by reference in its entirety herein. The flexible coupler and the plurality of shuttle/pull devices can extend through the sleeve in similar or different directions and/or orientations and/or locations.

A tensioner 100, 200 comprises an elongated shaft 10 of a surgical instrument 33, 133, the elongated shaft having a distal end and a proximal end; and a tensioning adapter 50, 150 configured to be securely attached to and detached from the proximal end, and to secure and tension at least one flexible strand 88. The tensioning adapter 50, 150 includes a body 51, an adjustment device 60, and a capturing mechanism 55. The capturing mechanism can include one or more suture cleats to capture and secure the at least one flexible strand 88. The adjustment device 60 can include a knob or a wheel. The tensioning adapter 50, 150 can be attached to and detached from a handle at the proximal end. The tensioning adapter 50, 150 can be reusable or disposable. The flexible strand 88 can be part of a surgical repair 101, 102, 103 undergone with the surgical instrument 33, 133.

A method of tissue repair comprises: attaching a tensioning adapter 50, 150 to a surgical instrument 33, 133; and conducting at least one surgical procedure with the surgical instrument 33, 133. The method can further comprise securing at least one flexible strand 88 to the tensioning adapter 50, 150; tensioning the at least one flexible strand 88; and conducting the at least one surgical procedure with the surgical instrument 33, 133. The tensioning the at least one flexible strand 88 can be conducted prior to conducting the at least one surgical procedure with the surgical instrument 33, 133. The tensioning the at least one flexible strand 88 can be conducted subsequently to conducting the at least one surgical procedure with the surgical instrument 33, 133. The tensioning the at least one flexible strand 88 can be conducted simultaneously with conducting the at least one surgical procedure with the surgical instrument 33, 133.

A method of tensioning a flexible strand 88 (flexible member 88) with a hybrid tensioner/surgical instrument 100, 200 comprises inter alia the steps of: (i) securing a flexible strand 88 to tissue 80, 90; (ii) attaching a tensioning adapter 50, 150 to a surgical instrument 33, 133; and (iii) tensioning the flexible strand 88 with the tensioning adapter 50, 150. The hybrid tensioner/surgical instrument 100, 200 can be maintained at the site of the surgical repair. The surgical instrument 33, 133 can be employed both for the surgical repair 101, 102, 103 and the tensioning of the strand 88 at the surgical repair site. The surgical repair and the tensioning can be both conducted without removing the instrument 33, 133 from the repair site. The tensioning adapter 50, 150 can be attached to a handle 40, 140 of the surgical instrument 33, 133.

An exemplary method of a tensioning technique employed in tissue fixation and tensioning comprises inter alia the steps: of (i) attaching a first tissue 80 to a second tissue 90 with at least one flexible strand 88; (ii) securing the at least one flexible strand 88 to a tensioning adapter 50, 150 removably attached to handle 40, 140 of a surgical instrument 33, 133; and (iii) exerting a desired tension on the at least one flexible strand 88. The method further includes the step of attaching the first tissue 80 to the second tissue 90 with the surgical instrument 33, 133. The tissue fixation can be a knotted or knotless soft tissue repair.

An exemplary method of tissue fixation and tensioning comprises inter alia the steps of: (i) manipulating a flexible strand 88 with a surgical instrument 33, 133 during a surgical procedure; (ii) securing the flexible strand 88 to a tensioning adapter 50, 150 removably attached to surgical instrument 33, 133; and (iii) exerting a desired tension on the flexible strand 88. Step (i) can be conducted before or after step (ii). The surgical procedure can be a soft tissue repair, a cerclage repair, or any known repair in the art that requires at least one flexible strand or suture and a surgical instrument including an elongate shaft. The surgical procedure can be a knotted or knotless soft tissue repair. The surgical procedure can be a knotless, self-locking, tensionable soft tissue repair.

Methods of soft tissue repair which do not require tying of knots and allow adjustment of both the tension of the suture and the location of the tissue with respect to the bone, while providing self-locking mechanisms, are also disclosed. A method of knotless tissue repair comprises inter alia the steps of: (i) securing a fixation device into a first tissue 90 (bone 90), the fixation device being preloaded with a flexible coupler 88; (ii) passing the flexible coupler 88 through a second tissue 80 (soft tissue 80) to be positioned relative to the first tissue 90 to form at least one adjustable, knotless, closed, continuous loop (suture passes 89) around the second tissue 80; (iii) loading the flexible coupler 88 onto a tensioning adapter 50 removably attached to handle 40 of a surgical instrument 33 provided in the vicinity of the repair site; (iv) exerting a desired tension on the flexible coupler 88 to tension final repair 101; and (v) cutting the flexible coupler 88 with surgical instrument 33. Repair 101 can be a self-locking, tensionable, knotless repair. The at least one adjustable, knotless, closed, continuous loop (suture passes 89) can be formed by employing at least one shuttle/pull device (at least one suture passing instrument) attached to the fixation device. The fixation device can be a hard-body anchor or a soft-body anchor, such as an all-suture anchor.

Flexible strand 88 (flexible coupler 88) can be suture, tape such as suture tape, wire, cable, fabric or any known suturing and/or cerclage material. Flexible strand 88 can include any flexible material, strand or ribbon such as suture or tape or combinations thereof, for example, multifilament, braided, knitted, woven suture, or including fibers of ultra-high molecular weight polyethylene (UHMWPE) or the FiberWire® suture (disclosed in U.S. Pat. No. 6,716,234, the disclosure of which is hereby incorporated by reference in its entirety herein). FiberWire® suture is formed of an advanced, high-strength fiber material, namely ultrahigh molecular weight polyethylene (UHMWPE), sold under the tradenames Spectra® (Honeywell International Inc., Colonial Heights, VA) and Dyneema® (DSM N.V., Heerlen, the Netherlands), braided with at least one other fiber, natural or synthetic, to form lengths of suture material. Flexible strand 88 can be also formed of tape, for example, Arthrex Fiber-Tape® suture tape, which is a high strength suture tape that is braided and rectangular-like in cross section and as disclosed in U.S. Pat. No. 7,892,256, the disclosure of which is incorporated by reference in its entirety herein. Flexible strand 88 can be also formed of a stiff material, or combination of stiff and flexible materials, and can be also coated and/or provided in different colors for easy manipulation during the surgical procedure.

Tensioning adapter 50, 150 is designed to allow a user to easily maneuver and turn the adapter during a suture tensioning procedure. Tensioning adapter 50, 150 can be a single-use disposable device or, alternatively, can be a reusable multiple-use device. Tensioning adapter 50, 150 can be removably attached to one or more surgical instruments (which can be similar to or different from each other). Tensioning adapter 50, 150 can be provided with a built-in tensiometer. Tensioning adapter 50, 150 can be released from an exemplary surgical instrument 33, 133 (device 33, 133) by either actuating a lever (for example, by pushing a lever) or by pulling the whole adapter out of the instrument.

The surgical constructs of the present disclosure may be employed in endoscopic surgery. The term "endoscopic surgery" refers to surgical procedures within a patient's body through small openings as opposed to conventional open surgery through large incisions. Additionally, surgical constructs as disclosed herein may be utilized in other general surgical and specialty procedures such as soft tissue repairs.

The term "high strength suture" is defined as any elongated flexible member, the choice of material and size being dependent upon the particular application. For the purposes of illustration and without limitation, the term "suture" as used herein may be a cable, filament, thread, wire, fabric, or any other flexible member suitable for tissue fixation in the body.

What is claimed is:

1. A method of tissue repair comprising:
    attaching a tensioning adapter to a surgical instrument and at a proximal end of a longitudinal elongated shaft of the surgical instrument so that the tensioning adapter is offset from a surgical site undergoing a knotless surgical procedure with the surgical instrument and with at least one flexible strand;
    conducting the knotless surgical procedure at the surgical site with the at least one flexible strand and with the surgical instrument and attached tensioning adapter, while the tensioning adapter is offset from the surgical site while a distal end of the longitudinal elongated shaft of the surgical instrument retains contact with the surgical site undergoing the knotless surgical procedure;
    loading the at least one flexible strand from the surgical site to the tensioning adapter;

subsequently, tensioning the at least one flexible strand with the tensioning adapter; and removing the tensioning adapter from the surgical instrument, wherein the tensioning adapter removably attaches to, and detaches from, the surgical instrument while the surgical instrument retains contact with the surgical site undergoing the knotless surgical procedure.

2. The method of claim 1, wherein the knotless surgical procedure is cutting of the at least one flexible strand, and wherein the surgical instrument is a suture cutter.

3. The method of claim 1, further comprising:
securing at least one limb of the at least one flexible strand to a securing mechanism of the tensioning adapter;
turning an adjustment device of the tensioning adapter to tension the at least one limb; and
removing the at least one limb from the tensioning adapter.

4. The method of claim 1, wherein the knotless surgical procedure includes inserting a fixation device within tissue or suture cutting.

5. The method of claim 1, wherein the tissue repair is soft tissue to bone repair.

6. The method of claim 1, wherein the tensioning adapter is provided with a first section and a second section, wherein the first section and the second section are configured to securely engage and attach to a first section and a second section, respectively, of the surgical instrument.

7. A method of tensioning a flexible strand comprising:
capturing the flexible strand from a repair site undergoing knotless tissue repair with a distal end of a surgical instrument, wherein the surgical instrument is provided with a longitudinal elongated shaft;
attaching a tensioning adapter to a proximal end of the longitudinal elongated shaft;
securing the flexible strand to the tensioning adapter;
positioning the distal end of the longitudinal elongated shaft against the repair site undergoing the knotless tissue repair and tensioning the flexible strand while the distal end maintains contact with the repair site; and
removing the tensioning adapter from the surgical instrument.

8. The method of claim 7, further comprising:
securing the flexible strand to a securing mechanism of the tensioning adapter;
turning an adjustment device of the tensioning adapter to tension the flexible strand; and
removing the flexible strand from the tensioning adapter.

9. The method of claim 7, further comprising securing tissue to another tissue with the flexible strand at the repair site.

10. The method of claim 9, wherein the tissue is soft tissue and the another tissue is bone.

11. The method of claim 7, wherein the knotless tissue repair is conducted with a fixation device.

12. The method of claim 11, wherein the fixation device is an all-suture anchor.

13. The method of claim 11, wherein the fixation device is a hard body anchor.

14. The method of claim 7, wherein the tensioning adapter is reusable.

15. The method of claim 7, wherein the tensioning adapter is disposable.

16. The method of claim 7, further comprising removably attaching, and detaching, the tensioning adapter to and from the surgical instrument while the surgical instrument retains contact with the repair site.

17. The method of claim 16, wherein the tensioning adapter is provided with a first section and a second section, wherein the first section and the second section are configured to securely engage and attach to a first section and a second section, respectively, of the surgical instrument.

* * * * *